(12) United States Patent
Okada et al.

(10) Patent No.: US 12,573,228 B2
(45) Date of Patent: Mar. 10, 2026

(54) DETERMINING APPARATUS, DETERMINING METHOD AND DETERMINING PROGRAM

(71) Applicant: NITTO DENKO CORPORATION, Ibaraki (JP)

(72) Inventors: Kazumasa Okada, Ibaraki (JP); Nobuyuki Kozonoi, Ibaraki (JP); Yugo Kaseda, Ibaraki (JP); Takamitsu Omasa, Tokyo (JP)

(73) Assignee: NITTO DENKO CORPORATION, Ibaraki (JP)

( * ) Notice: Subject to any disclaimer, the term of this patent is extended or adjusted under 35 U.S.C. 154(b) by 368 days.

(21) Appl. No.: 18/036,446

(22) PCT Filed: Nov. 5, 2021

(86) PCT No.: PCT/JP2021/040775
§ 371 (c)(1),
(2) Date: May 11, 2023

(87) PCT Pub. No.: WO2022/102534
PCT Pub. Date: May 19, 2022

(65) Prior Publication Data
US 2024/0021005 A1 Jan. 18, 2024

(30) Foreign Application Priority Data
Nov. 12, 2020 (JP) ................................. 2020-188581

(51) Int. Cl.
*G06V 40/10* (2022.01)
*A01K 29/00* (2006.01)
(Continued)

(52) U.S. Cl.
CPC ............ *G06V 40/10* (2022.01); *A01K 29/005* (2013.01); *G06T 7/70* (2017.01); *G06V 10/26* (2022.01);
(Continued)

(58) Field of Classification Search
None
See application file for complete search history.

(56) References Cited

U.S. PATENT DOCUMENTS

2018/0260976 A1 9/2018 Watanabe et al.
2019/0311216 A1 10/2019 Rampal
(Continued)

FOREIGN PATENT DOCUMENTS

JP 2018-148843 A 9/2018
WO 2018/100668 A1 6/2018

OTHER PUBLICATIONS

International Search Report issued for corresponding International Patent Application No. PCT/JP2021/040775, on Jan. 25, 2022, along with an English translation (5 pages).
(Continued)

*Primary Examiner* — Leon Viet Q Nguyen
(74) *Attorney, Agent, or Firm* — Hauptman Ham, LLP

(57) ABSTRACT

A determining apparatus includes a skeleton estimating unit configured to estimate a skeleton position of a processing-target ruminant from a photographed image; an extracting unit configured to extract a region of the processing-target ruminant from the photographed image; a cutting unit configured to cut a determining area for performing action determining of the processing-target ruminant based on the estimated skeleton position and the extracted region; and a determining unit configured to perform the action determining of the processing-target ruminant based on the cut determining area.

9 Claims, 12 Drawing Sheets

(51) Int. Cl.
G06T 7/70 (2017.01)
G06V 10/26 (2022.01)
G06V 10/774 (2022.01)
G06V 40/20 (2022.01)

(52) U.S. Cl.
CPC ............ G06V 10/774 (2022.01); G06V 40/20 (2022.01); *G06T 2207/20081* (2013.01); *G06T 2207/30181* (2013.01)

(56) References Cited

U.S. PATENT DOCUMENTS

| | | | |
|---|---|---|---|
| 2020/0211154 A1* | 7/2020 | Ng | A61B 5/1128 |
| 2021/0049370 A1* | 2/2021 | Hou | G06V 40/107 |
| 2021/0081782 A1* | 3/2021 | Lakshmi Narayanan | G06F 18/25 |
| 2021/0100451 A1* | 4/2021 | Cao | A61B 5/7475 |

OTHER PUBLICATIONS

Written Opinion issued for corresponding International Patent Application No. PCT/JP2021/040775, on Jan. 25, 2022 (3 pages).

Liu et al., "Video analytic system for detecting cow structure", Computers and Electronics in Agriculture, vol. 178, Sep. 23, 2020, pp. 105761.1-105761.11 (13 pages).

Li et al., "Deep cascaded convolutional models for cattle pose estimation", Computers and Electronics in Agriculture, Jul. 22, 2019, vol. 164, pp. 104885.1-104885.11 (13 pages).

Chen et al., "Automatic monitoring method of cow ruminant behavior based on spatio-temporal context learning", International Journal of Agricultural and Biological Engineering, Jul. 2018, vol. 11, No. 4, pp. 179-185 (7 pages).

* cited by examiner

TRAINING PROCESS START

ACQUIRE PHOTOGRAPHED IMAGE — S801

GENERATE DETERMINING DATA — S802

ACQUIRE ACTION INFORMATION — S803

GENERATE TRAINING DATA — S804

PERFORM TRAINING PROCESS FOR DETERMINING MODEL — S805

TRAINING PROCESS COMPLETED? — S806

NO

YES

TRAINING PROCESS END

DETERMINING DATA GENERATING UNIT 1030

PHOTO-GRAPHED IMAGE

401
IMAGE ACQUIRING UNIT

402
CATTLE REGION EXTRACTING UNIT

1031
REFLECTING MEMBER DETECTING UNIT

1032
SKELETON ESTIMATING UNIT

404
CATTLE REGION FOLLOWING UNIT

405
MOUTH PERIPHERY CUTTING UNIT

DETER-MINING DATA

11a 1110  1122  1022  1140  140
1010

11b

1130

DETERMINING DATA GENERATING UNIT

PHOTO-GRAPHED IMAGE

401
IMAGE ACQUIRING UNIT

1131
REFLECTING MEMBER DETECTING UNIT

1132
CATTLE REGION EXTRACTING UNIT

403
SKELETON ESTIMATING UNIT

404
CATTLE REGION FOLLOWING UNIT

405
MOUTH PERIPHERY CUTTING UNIT

DETER-MINING DATA

140

1201

12a

1230

DETERMINING DATA GENERATING UNIT

PHOTO-GRAPHED IMAGE

401

IMAGE ACQUIRING UNIT

1231

REFLECTING MEMBER DETECTING UNIT

402

CATTLE REGION EXTRACTING UNIT

403

SKELETON ESTIMATING UNIT

404

CATTLE REGION FOLLOWING UNIT

1232

MOUTH PERIPHERY AND REFLECTING MEMBER CUTTING UNIT

DETER-MINING DATA

12b

DETERMINING APPARATUS, DETERMINING METHOD AND DETERMINING PROGRAM

CROSS REFERENCE TO RELATED APPLICATION

This application is a National Stage of International Application No. PCT/JP2021/040775, filed on Nov. 5, 2021, which designates the United States and was published in Japan, and which is based upon and claims priority to Japanese Patent Application No. 2020-188581, filed on Nov. 12, 2020 in the Japan Patent Office. All of the aforementioned applications are hereby incorporated by reference in their entireties.

TECHNICAL FIELD

The present invention relates to a determining apparatus, a determining method and a determining program.

BACKGROUND ART

Conventionally, efforts have been made to manage health conditions of each individual of livestock animals among ruminants, such as cattle, by photographing, and performing action determining of each individual from a photographed image.

PRIOR ART DOCUMENT

Patent Literature

Patent Document 1: Japanese Unexamined Patent Application Publication No. 2018-148843

SUMMARY OF THE INVENTION

Problems to be Solved by the Invention

On the other hand, in order to accurately perform the action determining of ruminants, it is necessary to determine an orientation, a posture and the like of each individual from the photographed image, and accurately capture movements of parts thereof. However, in the case of livestock animals such as cattle, they are often bred densely within a limited area, and it is not easy to perform action determining of each individual from the photographed images.

In one aspect, an object is to accurately perform action determining of ruminants from photographed images.

Means for Solving the Problem

According to an aspect of the present disclosure, a determining apparatus includes
a skeleton estimating unit configured to estimate a skeleton position of a processing-target ruminant from a photographed image;
an extracting unit configured to extract a region of the processing-target ruminant from the photographed image;
a cutting unit configured to cut a determining area for performing action determining of the processing-target ruminant based on the estimated skeleton position and the extracted region; and a determining unit configured to perform the action determining of the processing-target ruminant based on the cut determining area.

Effect of the Invention

It is possible to accurately perform action determining of ruminants from photographed images.

MODE FOR CARRYING OUT THE INVENTION

Figure 1:
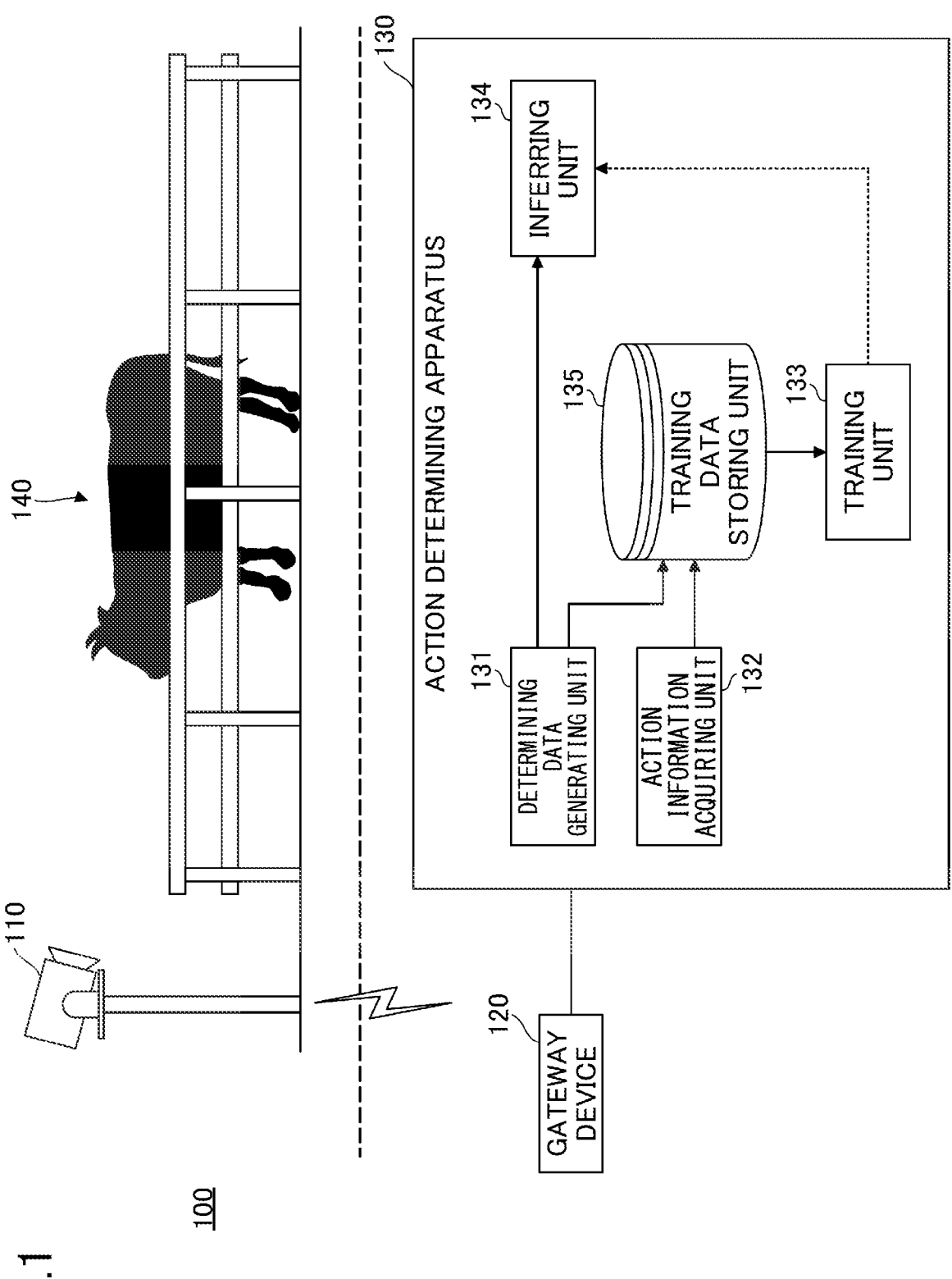
FIG. 1 is a diagram showing an example of a system configuration of an action determining system and a functional configuration of an action determining apparatus.

Hereinafter, each embodiment will be described with reference to the accompanying drawings. In the present specification and the drawings, for components having substantially the same functional configurations, duplicate descriptions will be omitted by providing the same reference numerals thereto.

First Embodiment

<System Configuration of Action Determining System and Functional Configuration of Action Determining Apparatus>
First, a system configuration of an action determining system and a functional configuration of an action determining apparatus will be described. FIG. 1 shows an example of the system configuration of the action determining system and the functional configuration of the action determining apparatus.

The action determining system 100 is a system that photographs ruminants (in the present embodiment, cattle that are livestock animals) using an imaging apparatus, and sequentially determines an action of each cow (in the present embodiment, ruminating action) from a photographed image.

As shown in FIG. 1, the action determining system 100 has an imaging apparatus 110, a gateway device 120, and an action determining apparatus 130. In the action determining system 100, the imaging apparatus 110 and the gateway device 120 are connected via a wireless communication, and the gateway device 120 and the action determining apparatus 130 are communicably connected via a network (not shown).

The imaging apparatus 110 photographs a plurality of cows including processing-target cows (in the present embodiment, cattle 140) from above at a predetermined frame rate. Thus, by photographing from above, the photographed image of each frame includes a mouth, a head, a neck, a buttock, and the like of a cow 140.

In addition, the imaging apparatus 110 has an imaging element capable of receiving infrared light (for example, infrared light with a central wavelength of 950 nm) projected from a floodlight, which is not shown, so that an image can be photographed day and night. Specifically, the imaging apparatus 110 has an imaging element that can receive light with a wavelength of, for example, 850 nm to 950 nm, and has, for example, 1920×1080 pixels.

The action determining apparatus 130 is an apparatus that sequentially determines a ruminating action of the cow 140 from photographed images imaged by the imaging apparatus 110. An action determining program is installed in the action determining apparatus 130. When the program is executed, the action determining apparatus 130 functions as a determining data generating unit 131, an action information acquiring unit 132, a training unit 133, and an inferring unit 134.

The determining data generating unit 131 cuts a mouth periphery area that is a determining area useful for determining presence or absence of a ruminating action of the cow 140 from a photographed image transmitted from the gateway device 120, and generates determining data. In a training phase, the determining data generating unit 131 stores generated determining data in a training data storing unit 135 as input data for training data. Furthermore, in an inferring phase, the determining data generating unit 131 notifies the inferring unit 134 of generated determining data.

In the training phase, the action information acquiring unit 132 accepts an input of action information of the cow 140 (information indicating presence or absence of a ruminating action) and stores it in the training data storing unit 135 as correct answer data of the training data in association with the determining data.

The training unit 133 has a determining model to associate the determining data with the information indicating presence or absence of a ruminating action. The training unit 133 reads training data from the training data storing unit 135, and sequentially inputs the determining data of a predetermined time range contained in the read training data into the determining model.

The training unit 133 also performs training process on the determining model so that an output result sequentially output from the determining model approaches correct answer data (information indicating presence or absence of a ruminating action) contained in the read training data.

The inferring unit 134 is an example of the determining unit. The inferring unit 134 inputs determining data of the cow 140 into the trained model, which is generated by the training unit 133 through the training process, in each predetermined time range, and sequentially infers presence or absence of a ruminating action of the cow 140.

Thus, in the action determining apparatus 130 according to the first embodiment, a determining area useful for determining presence or absence of a ruminating action of a processing-target cow is cut from a photographed image to generate determining data, and presence or absence of the ruminating action is inferred using the determining data.

Thus, according to the first embodiment, presence or absence of a ruminating action of a processing-target cow can be accurately determined from a photographed image.

<Hardware Configuration of Action Determining Apparatus>

Figure 2:
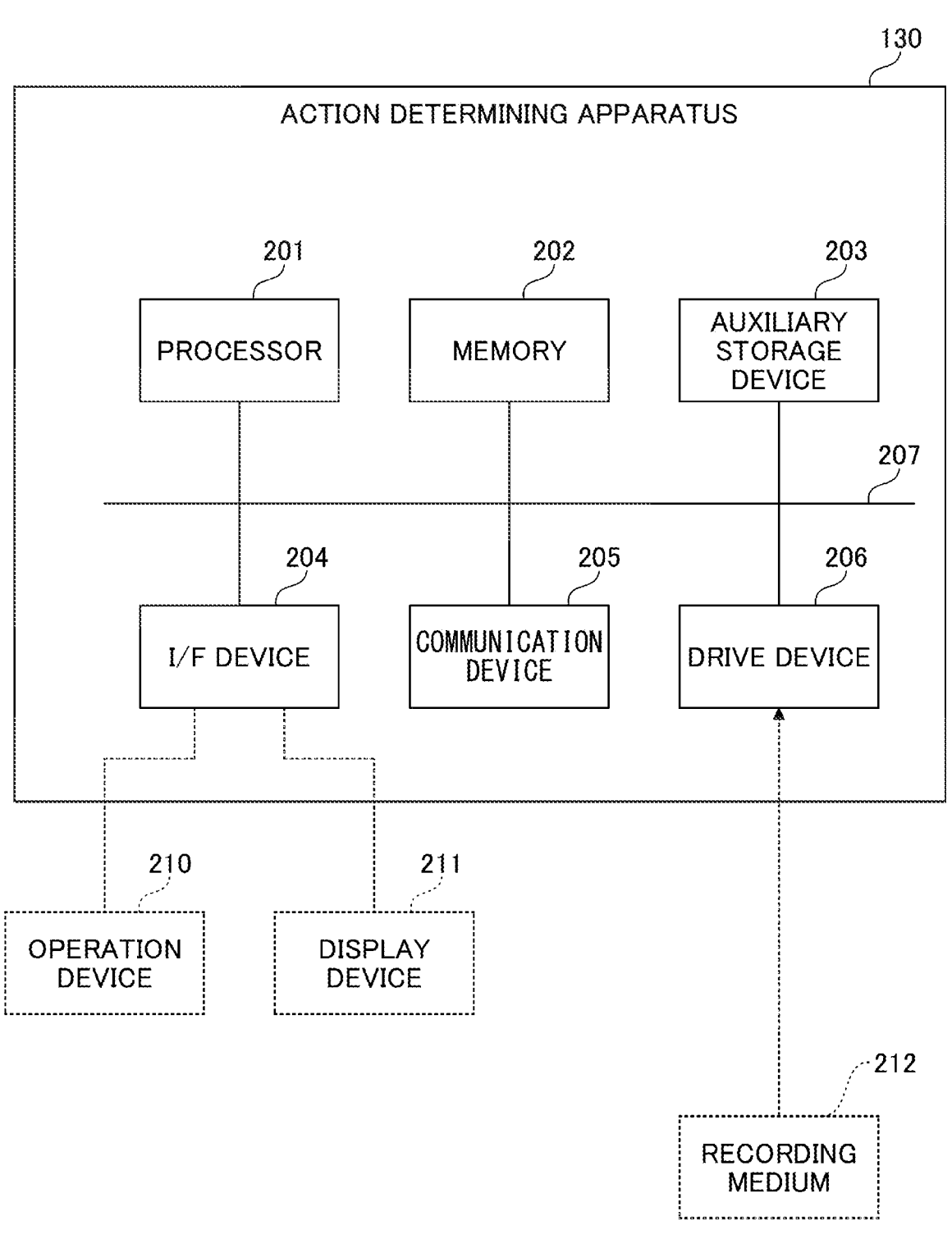
FIG. 2 is a diagram showing an example of a hardware configuration of the action determining apparatus.

Next, a hardware configuration of the action determining apparatus 130 will be described. FIG. 2 is a diagram showing an example of the hardware configuration of the action determining apparatus. As shown in FIG. 2, the action determining apparatus 130 includes a processor 201, a memory 202, an auxiliary storage device 203, an I/F (Interface) device 204, a communication device 205, and a drive device 206. Respective pieces of hardware of the action determining apparatus 130 are connected to each other via a bus 207.

The processor 201 includes various operation devices such as a CPU (Central Processing Unit) and a GPU (Graphics Processing Unit). The processor 201 reads various programs (for example, an action determining program) on the memory 202 and executes them.

The memory 202 has a main storage device such as ROM (Read Only Memory) and RAM (Random Access Memory). The processor 201 and the memory 202 form a so-called computer, and when the processor 201 executes various programs read on the memory 202, the computer implements, for example, the above-described functions (the determining data generating unit 131 through to the inferring unit 134).

The auxiliary storage device 203 stores various programs and various data which are used when various programs are executed by the processor 201. For example, the training data storing unit 135 is implemented in the auxiliary storage device 203.

The I/F device 204 is a connecting device that connects the operation device 210 and the display device 211, which are examples of external devices, and the action determining apparatus 130. The I/F device 204 accepts an operation for the action determining apparatus 130 through the operation device 210. The I/F device 204 outputs a result of processing by the action determining apparatus 130 and displays the result through the display device 211.

The communication device 205 is a communication device for communicating with other devices. In the case of the action determining apparatus 130, the communication device 205 communicates with the gateway device 120, which is another device.

The drive device 206 is a device for setting a recording medium 212. The recording medium 212 mentioned here includes a medium for recording information optically, electrically, or magnetically, such as a CD-ROM, a flexible disk, or a magneto-optical disk. The recording medium 212 may also include a semiconductor memory, or the like, for electrically recording information, such as a ROM, or a flash memory.

Various programs to be installed in the auxiliary storage device 203 are installed, for example, when the distributed recording medium 212 is set in the drive device 206 and various programs recorded in the recording medium 212 are read by the drive device 206. Alternatively, various programs to be installed in the auxiliary storage device 203 may be installed by being downloaded from the network via the communication device 205.

<Specific Examples of Training Data>

Figure 3:
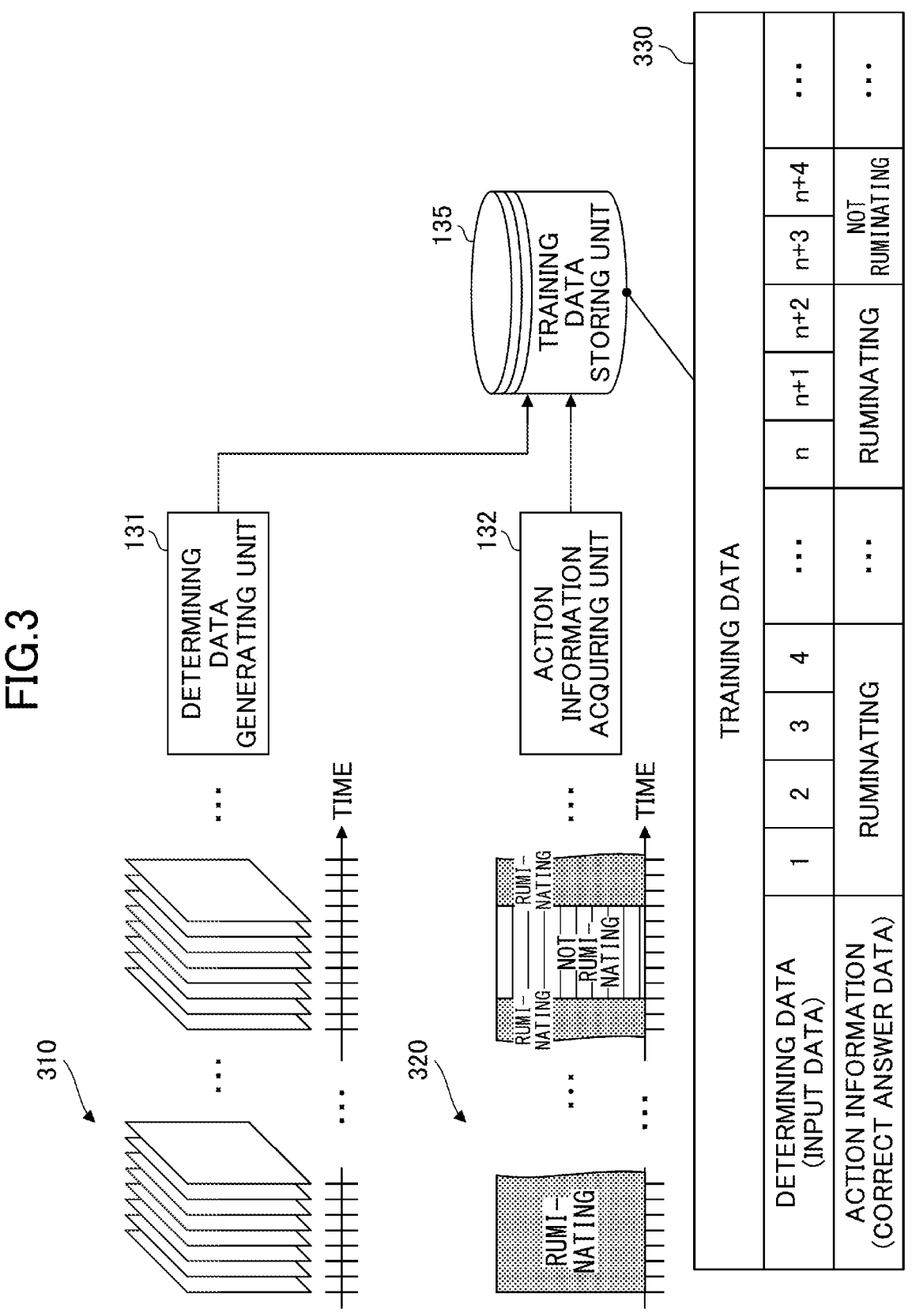
FIG. 3 is a diagram showing an example of training data.

Next, a specific example of training data stored in the training data storing unit 135 will be described. FIG. 3 is a diagram showing an example of the training data.

As shown in FIG. 3, training data 330 stored in the training data storing unit 135 include "determining data (input data)" and "action information (correct answer data)" as information items.

Each piece of determining data generated by the determining data generating unit 131 is stored in "determining data (input data)" based on a photographed image 310 (a photographed image photographed at a predetermined frame rate) transmitted from the gateway device 120. Each number stored in the "determining data (input data)" is an identification number for identifying each piece of determining data.

The "action information (correct answer data)" stores information 320 indicating presence or absence of a ruminating action of the cow 140 at each time when each photographed image used to generate the corresponding determining data is photographed. The example of the training data 330 shows that the cow 140 was in a ruminating action at each time when each photographed image used to generate each piece of determining data from identification number 1 to identification number n+2 was photographed. The example of the training data 330 also shows that the cow 140 was not in a ruminating action at each time when each photographed image used to generate each piece of determining data from identification numbers n+3 and n+4 was photographed.

<Functional Configuration of Determining Data Generating Unit>

Figure 4:
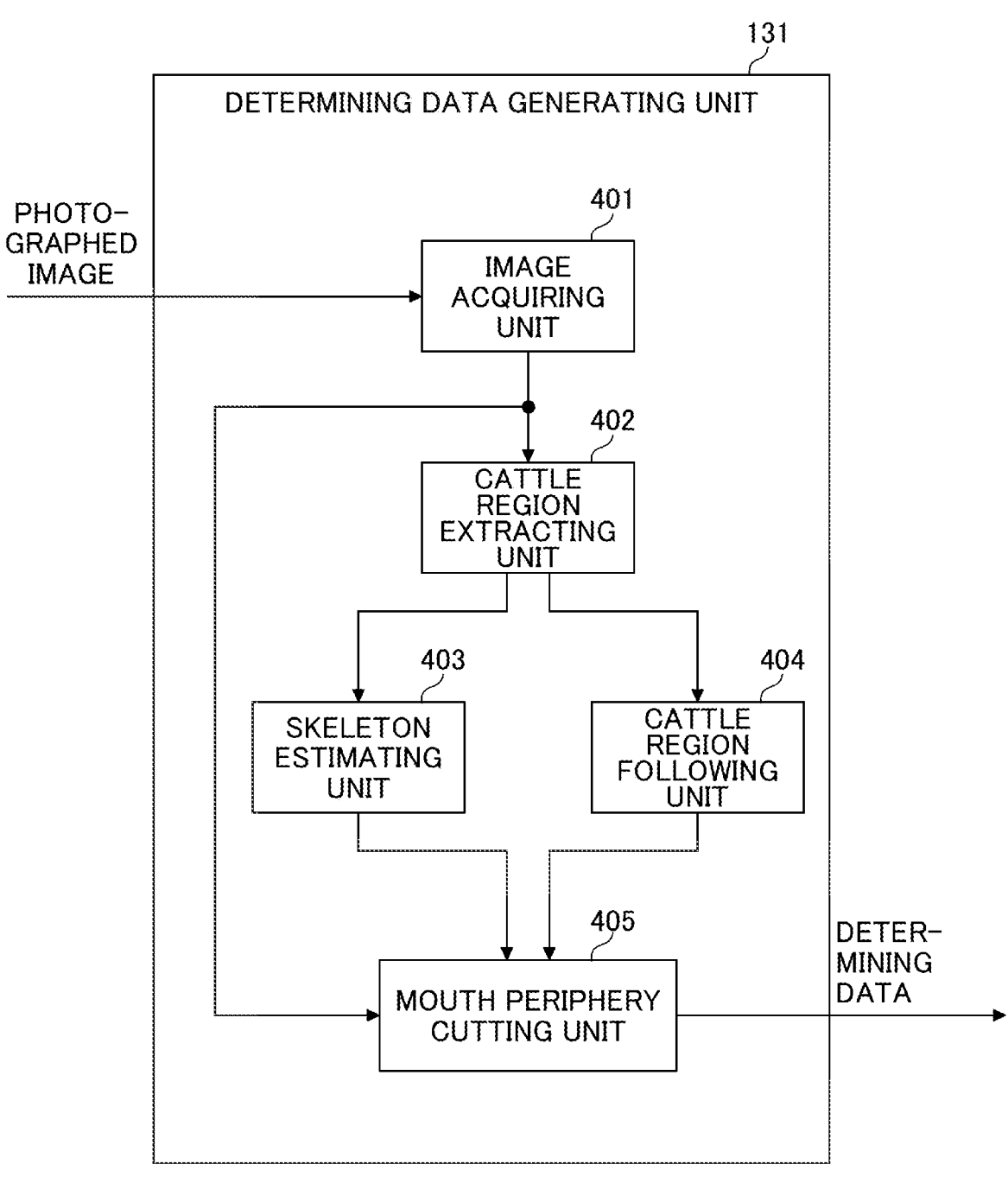
FIG. 4 is a diagram showing an example of a functional configuration of a determining data generating unit.
Figure 5:
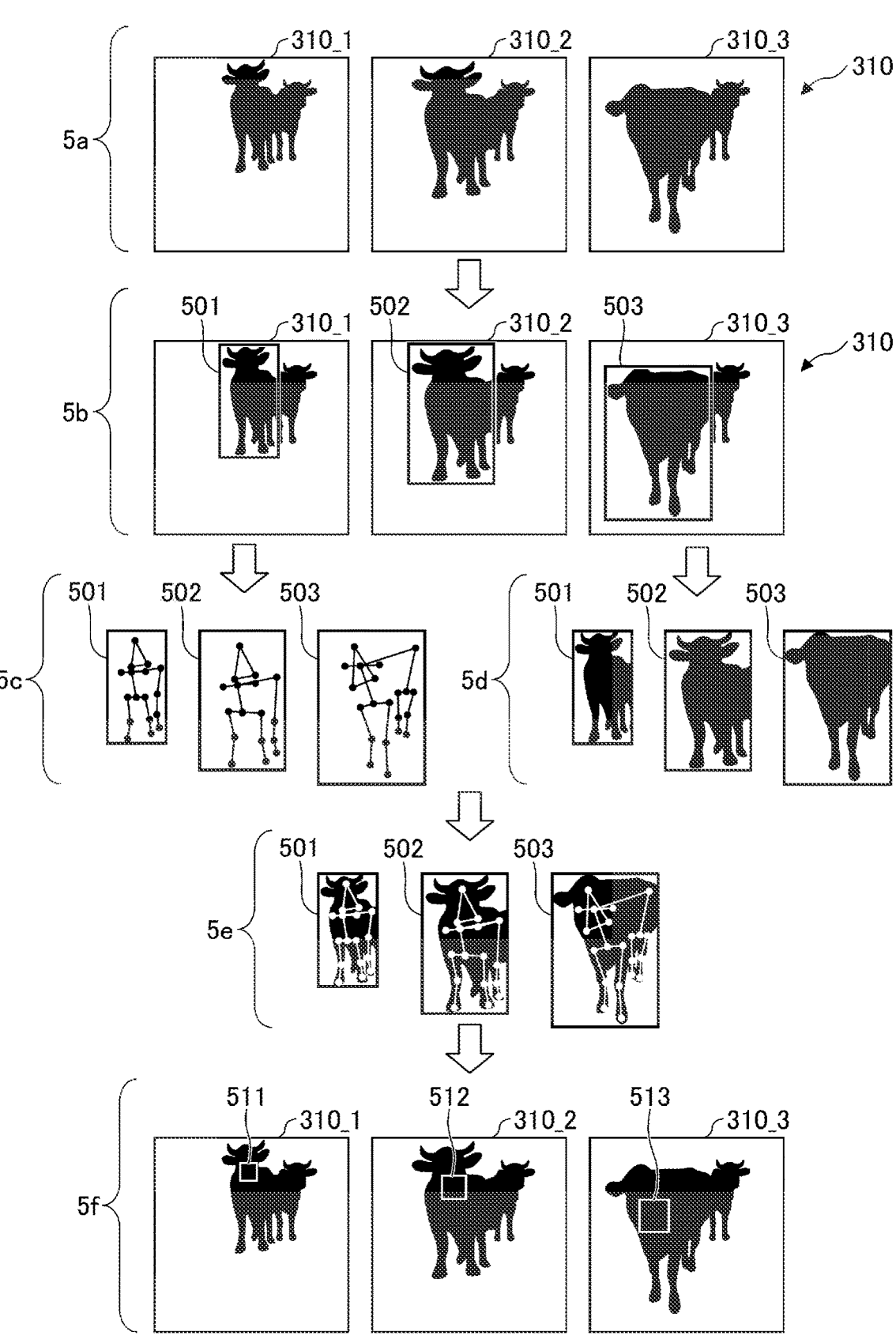
FIG. 5 is a diagram showing a specific example of a determining data generating process.

Next, the functional configuration of the determining data generating unit 131 will be described with reference to FIG. 5 using FIG. 4. FIG. 4 is a diagram showing an example of the functional configuration of the determining data generating unit. FIG. 5 is a diagram showing a specific example of the determining data generating process.

As shown in FIG. 4, the determining data generating unit 131 has an image acquiring unit 401, a cattle region extracting unit 402, a skeleton estimating unit 403, a cattle region following unit 404, and a mouth periphery cutting unit 405.

The image acquiring unit 401 acquires the photographed image 310 transmitted from the gateway device 120. An example of 5a in FIG. 5 shows a state in which the image acquiring unit 401 acquires three temporally consecutive photographed images 310_1, 310_2, and 310_3 out of photographed images of two cows. The image acquiring unit 401 notifies the acquired photographed image 310 to the cattle region extracting unit 402 and the mouth periphery cutting unit 405.

The cattle region extracting unit 402 extracts a rectangular area including each cow included in the photographed image 310. The cattle region extracting unit 402 notifies skeleton estimating unit 403 and the cattle region following unit 404 of the extracted rectangular area.

An example of 5b in FIG. 5 shows a state in which the cattle region extracting unit 402 extracts a rectangular area 501 containing a processing-target cow (cow 140) from the photographed image 310_1, and a rectangular area 502 containing the processing-target cow (cow 140) from the photographed image 310_2. Moreover, the example of 5b in FIG. 5 shows a state in which the cattle region extracting unit 402 extracts a rectangular area 503 containing the processing-target cow (cow 140) from the photographed image 310_3.

Although the example of 5b in FIG. 5 only shows the rectangular area containing the processing-target cow (cow 140), the cattle region extracting unit 402 also extracts a rectangular area containing a cow other than the processing-target cow (cow 140).

The skeleton estimating unit 403 estimates the skeleton position (two-dimensional) of the cow contained in the rectangular area extracted by the cattle region extracting unit 402. Thus, an orientation, a posture, or the like of the cow can be determined, and a position of a periphery of a mouth of the cow can be determined. In addition, the skeleton estimating unit 403 notifies the estimated skeleton position of the cow to the mouth periphery cutting unit 405.

An example of 5c in FIG. 5 shows a state in which the skeleton estimating unit 403 estimated the skeleton position of the processing-target cow (cow 140) included in the rectangular area 501. The example 5c also shows a state in which the skeleton position of the processing-target cow (cow 140) included in the rectangular area 502 was estimated. The example 5c also shows a state in which the skeleton position of the processing-target cow (cow 140) included in the rectangular area 503 was estimated.

Although the example of 5c in FIG. 5 shows only the skeleton position of the processing-target cow (cow 140), the skeleton estimating unit 403 also estimates a skeleton position of the cow other than the processing-target cow (cow 140) contained in the rectangular area extracted by the cattle region extracting unit 402.

The cattle region following unit 404 is an example of an extracting unit. The cattle region following unit 404 extracts an area of the processing-target cow (cow 140) from the rectangular area extracted by the cattle region extracting unit 402 following the movement of the cow. The cattle region following unit 404 also notifies the mouth periphery cutting unit 405 of the area of the processing-target cow (cow 140) extracted following the movement.

An example 5d in FIG. 5 shows a state in which the cattle region following unit 404 extracted an area of the processing-target cow (cow 140) from the rectangular area 501. The example 5d also shows a state in which an area of the processing-target cow (cow 140) was extracted from the rectangular area 502. The example 5d also shows a state in which an area of the processing-target cow (cow 140) was extracted from the rectangular area 503.

The mouth periphery cutting unit 405 is an example of a cutting unit. The mouth periphery cutting unit 405 identifies coordinates of an area around the mouth of the processing-target cow (cow 140) by superimposing the skeleton position estimated by the skeleton estimating unit 403 with the area extracted following by the cattle region following unit 404.

An example of 5e in FIG. 5 shows a state in which the mouth periphery cutting unit 405 identifies the coordinates of the area around the mouth of the processing-target cow (cow 140) by superimposing the skeleton position of the processing-target cow (cow 140) in the rectangular area 501, estimated by the skeleton estimating unit 403; with the area of the processing-target cow (cow 140) in the rectangular area 501 extracted by the cattle region following unit 404.

The example of 5e in FIG. 5 shows a state in which the mouth periphery cutting unit 405 identifies the coordinates of the area around the mouth of the processing-target cow (cow 140) by superimposing the skeleton position of the processing-target cow (cow 140) in the rectangular area 502, estimated by the skeleton estimating unit 403; with the area of the processing-target cow (cow 140) in the rectangular area 502 extracted by the cattle region following unit 404.

The example of 5e in FIG. 5 shows a state in which the mouth periphery cutting unit 405 identifies the coordinates of the area around the mouth of the processing-target cow (cow 140) by superimposing the skeleton position of the processing-target cow (cow 140) in the rectangular area 503, estimated by the skeleton estimating unit 403; with the area of the processing-target cow (cow 140) in the rectangular area 503 extracted by the cattle region following unit 404.

Based on the identified coordinates, the mouth periphery cutting unit 405 cuts the area around the mouth, which is a determining area for determining presence or absence of a ruminating action of the processing-target cow (cow 140), from the photographed image notified by the image acquiring unit 401, and outputs the area as determining data.

An example of 5f in FIG. 5 shows a state in which the mouth periphery cutting unit 405 cuts the area around the mouth 511 of the processing-target cow (cow 140) from the photographed image 310_1 based on the identified coordinates, and outputs the area as determining data. The example of 5f in FIG. 5 shows a state in which the mouth periphery cutting unit 405 cuts the area around the mouth 512 of the processing-target cow (cow 140) from the photographed image 310_2 based on the identified coordinates, and outputs the area as determining data. The example of 5f in FIG. 5 shows a state in which the mouth periphery cutting unit 405 cuts the area around the mouth 513 of the processing-target cow (cow 140) from the photographed image 310_3 based on the identified coordinates, and outputs the area as determining data.

In the above description, the mouth periphery cutting unit 405 cuts the area around the mouth from each photographed image, but the cut image is not limited to being cut from the photographed image. For example, the area may be cut from the rectangular area extracted by the cattle region extracting unit 402, or from the area of the processing-target cow extracted by the cattle region following unit 404.

<Functional Configuration of the Training Unit>

Figure 6:
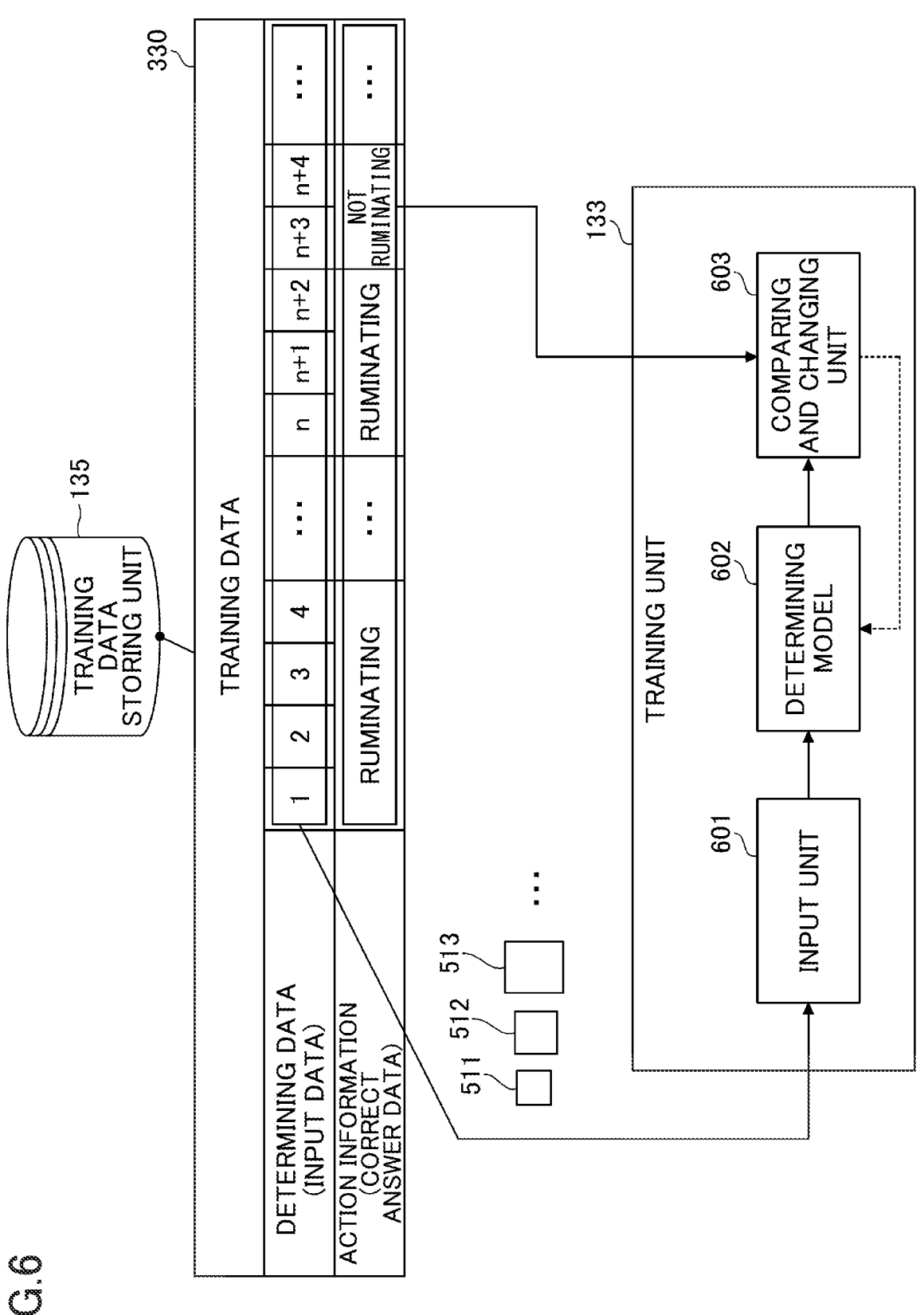
FIG. 6 is a diagram showing an example of a functional configuration of a training unit.

Next, the functional configuration of the training unit 133 will be described. FIG. 6 is a diagram showing an example of the functional configuration of the training unit.

As shown in FIG. 6, the training unit 133 includes an input unit 601, a determining model 602, and a comparing and changing unit 603.

The input unit 601 reads out the determining data contained in the training data 330 in each predetermined time range from the training data storing unit 135 and inputs the data to the determining model 602.

The determining model 602 outputs information indicating presence or absence of a ruminating action (classification probability of "presence" and classification probability of "absence") according to an input of the determining data in each predetermined time range by the input unit 601. The determining model 602 updates model parameters based on errors back-propagated from the comparing and changing unit 603.

The comparing and changing unit 603 reads the information indicating presence or absence of a ruminating action contained in the training data 330 as correct answer data from the training data storing unit 135, and calculates an error with the output result outputted from the determining model 602. The comparing and changing unit 603 back-propagates the calculated error, and updates the model parameters of the determining model 602. Thus, training process can be performed on the determining model 602 so that the output result output from the determining model 602 approaches the correct answer data.

<Functional Configuration of the Inferring Unit>

Figure 7:
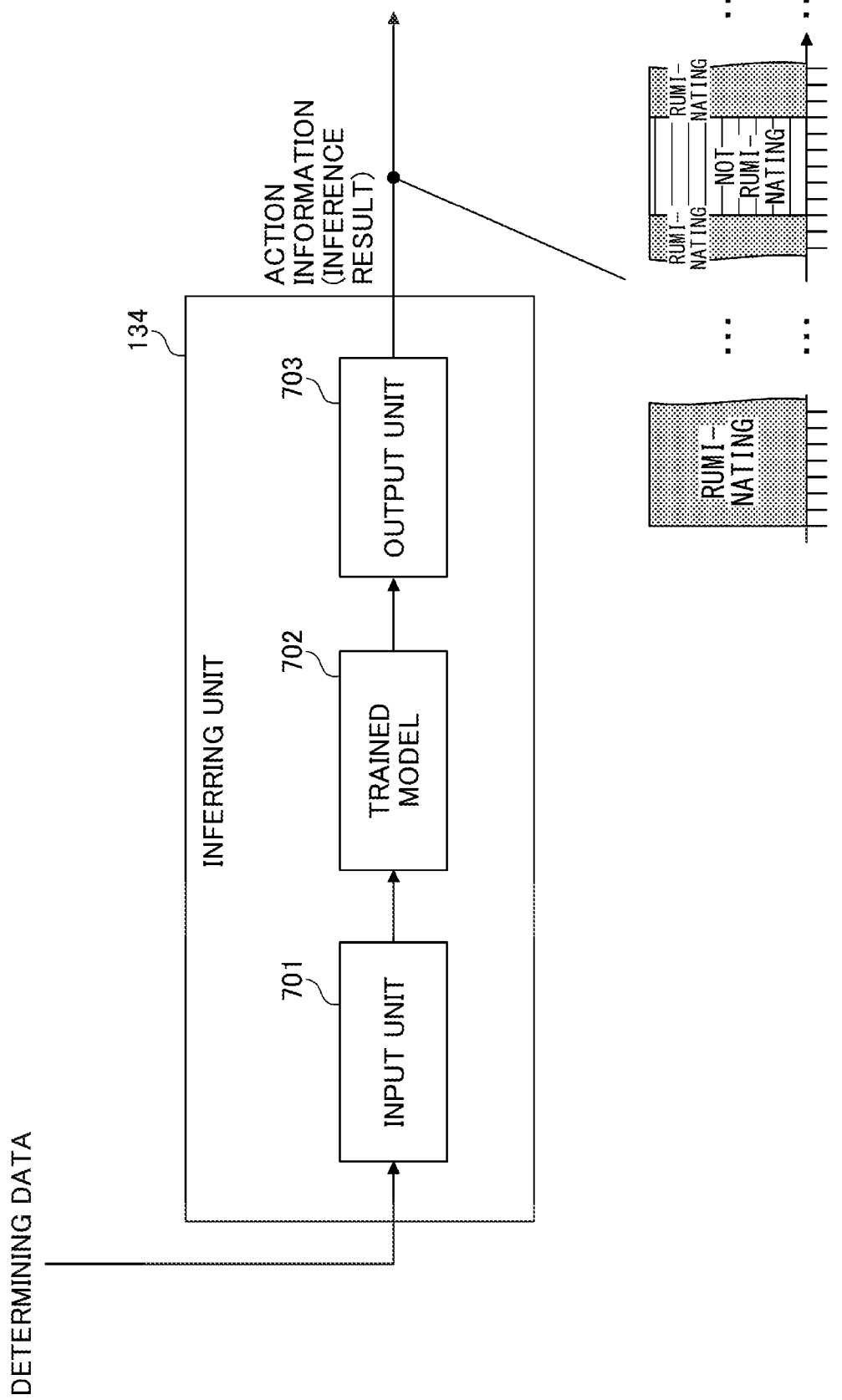
FIG. 7 is a diagram showing an example of a functional configuration of an inferring unit.

Next, a functional configuration of the inferring unit 134 will be described. FIG. 7 is a diagram showing an example of the functional configuration of the inferring unit.

As shown in FIG. 7, the inferring unit 134 includes an input unit 701, a trained model 702, and an output unit 703.

The input unit 701 inputs determining data generated by the determining data generating unit 131 into the trained model 702 in each predetermined time range.

The trained model 702 is a trained model generated by the training unit 133 performing training process on the determining model 602, and infers information indicating presence or absence of a ruminating action by inputting the determining data.

The output unit 703 visualizes and outputs presence or absence of a ruminating action of the processing-target cow at each time inferred by the trained model 702.

<Flow of Training Process in the Action Determining Apparatus>

Figure 8:
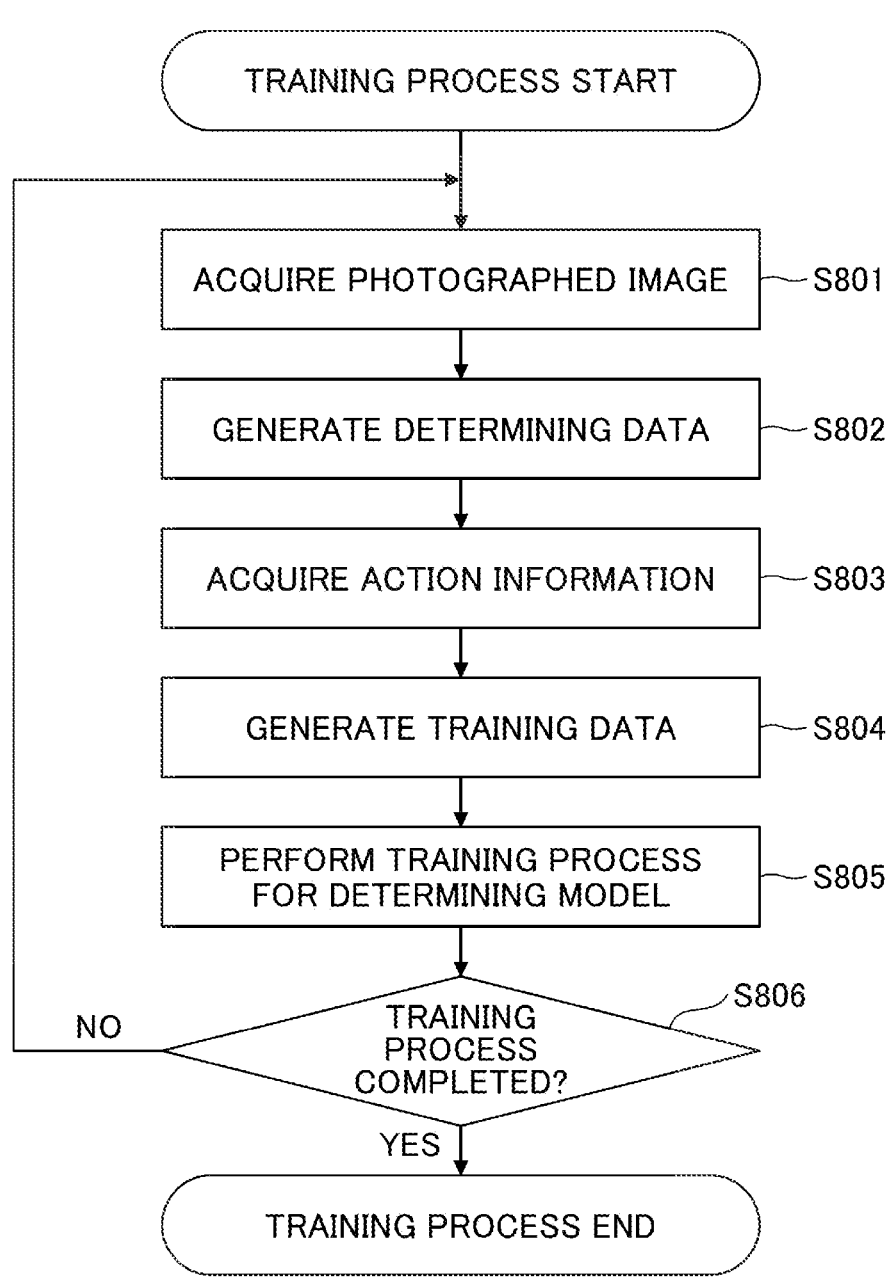
FIG. 8 is a flowchart illustrating a flow of a training process.

Next, a flow of the training process in the action determining apparatus 130 will be described. FIG. 8 is a flowchart showing the flow of the training process.

In step S801, a determining data generating unit 131 acquires a photographed image.

In step S802, a determining data generating unit 131 generates determining data based on the acquired photographed image.

In step S803, the action information acquiring unit 132 acquires action information (information indicating presence or absence of a ruminating action) corresponding to the photographed image.

In step S804, the determining data generating unit 131 stores the generated determining data in association with the action information acquired by the action information acquiring unit 132, thereby generating training data and storing the training data in the training data storing unit 135.

In step S805, the training unit 133 performs training process on the determining model using the training data.

In step S806, the training unit 133 determines whether the training process has been completed. If it is determined in step S806 that the training process has not been completed (NO in step S806), the process returns to step S801.

On the other hand, if it is determined in step S806 that the training process has been completed (YES in step S806), the trained model is notified to the inferring unit 134, and the training process ends.

<Flow of Inferring Process in Action Determining Apparatus>

Figure 9:
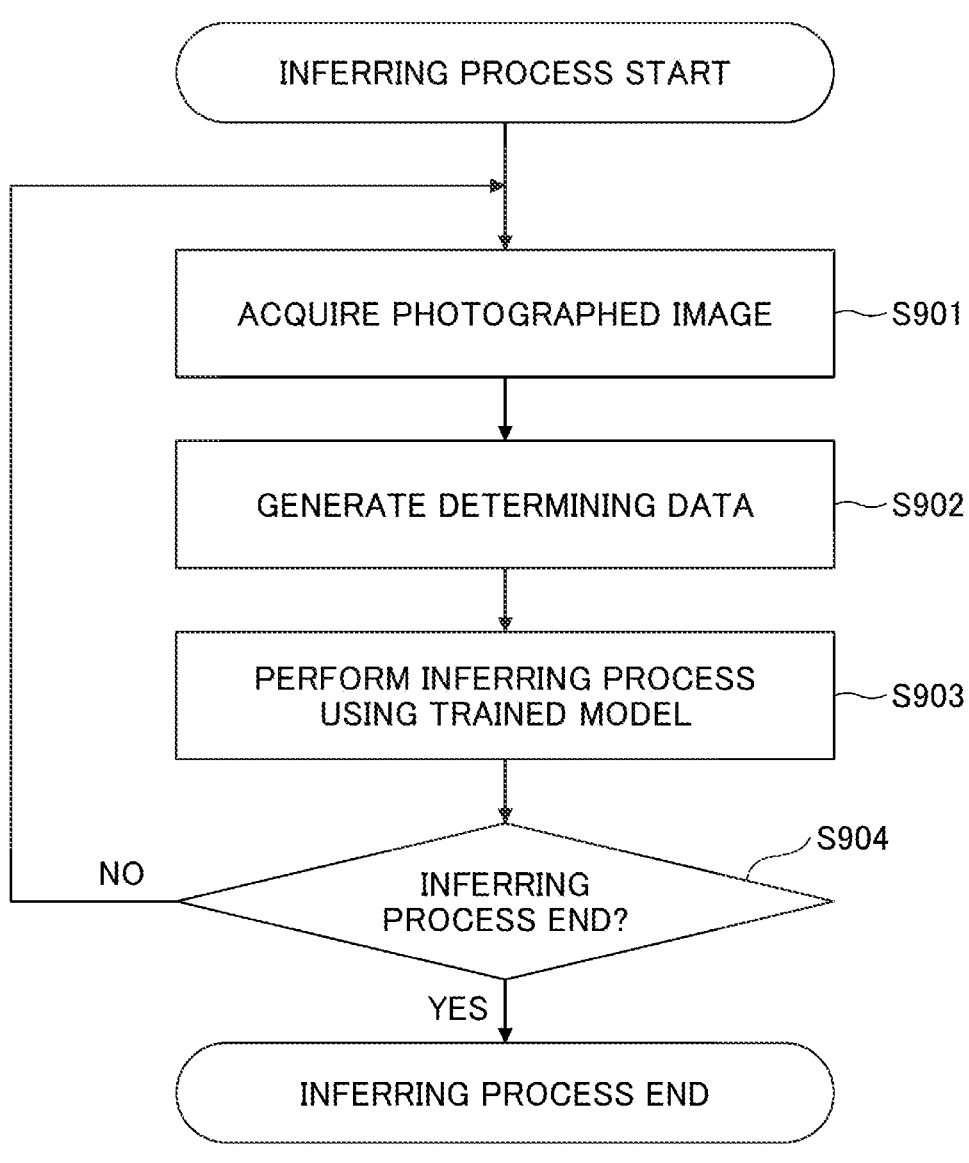
FIG. 9 is a flowchart illustrating a flow of an inferring process.

Next, a flow of an inferring process in the action determining apparatus 130 will be described. FIG. 9 is a flowchart showing the flow of the inferring process.

In step S901, the determining data generating unit 131 acquires a photographed image.

In step S902, the determining data generating unit 131 generates determining data based on the acquired photographed image.

In step S903, the inferring unit 134 performs inferring process by inputting the determining data into the trained model in each predetermined time range, and infers information indicating presence or absence of a ruminating action.

In step S904, the inferring unit 134 determines whether to terminate the inferring process. If the inferring process is determined to be continued in step S904 (NO in step S904), the process returns to step S901.

On the other hand, if the inferring process is determined to be terminated in step S904 (YES in step S904), the inferring process ends.

Summary

As is clear from the above description, the action determining apparatus 130 according to the first embodiment has the following features:

being equipped with a skeleton estimating unit that estimates a skeleton position of the processing-target cow from the photographed image;

being equipped with a cattle region following unit that extracts a region of the processing-target cow from the photographed image;

being equipped with a mouth periphery cutting unit that cuts an area around a mouth of the processing-target cow, which is a determining area for determining presence or absence of a ruminating action of the processing-target cow; and being equipped with an inferring unit that determines presence or absence of a ruminating action of the processing-target cow based on the cut area around the mouth.

Thus, according to the first embodiment, the action determining of a ruminant can be accurately performed from a photographed image, by cutting a useful determining area for determining an action of the processing-target cow to generate determining data, and performing the action determining using the determining data.

Second Embodiment

In the first embodiment described above, when the determining data are generated from the photographed image, the skeleton position is estimated directly from the rectangular area containing the cow. On the other hand, in the second embodiment, a reflecting member, which is an example of an optical member, is attached to the cow in advance, and the skeleton position is estimated in consideration of a position of the reflecting member detected from the photographed image. Thus, according to the second embodiment, the estimation accuracy of the skeleton position can be improved. Hereafter, the second embodiment will be described with a focus on differences from the first embodiment.

<Functional Configuration of Determining Data Generating Unit>

Figure 10:
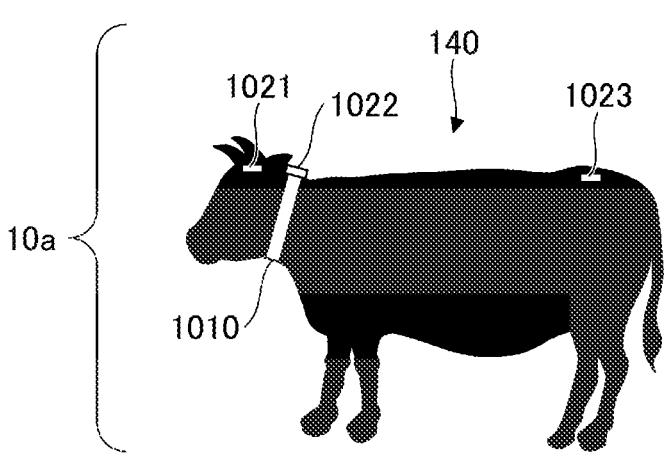
FIG. 10 is a first diagram showing another example of a functional configuration of the determining data generating unit.

First, a functional configuration of the determining data generating unit in the action determining apparatus according to the second embodiment will be described. FIG. 10 is a first diagram showing another example of the functional configuration of the determining data generating unit.

In FIG. 10, 10a shows a position of the reflecting member when the reflecting member is attached to the cow 140. The example of 10a in FIG. 10 shows a state in which a reflecting member 1021 is attached to a head of the cow 140, a reflecting member 1022 is attached to a neck of the cow 140

(upper part of a neck attachment member 1010), and a reflecting member 1023 is attached to buttocks of the cow 140.

Note that the attachment positions and the number of attachments of the reflecting members shown in 10a of FIG. 10 is an example, and the reflecting members may be attached to other positions (for example, neck, mouth, or the like) other than the positions shown in 10a of FIG. 10. The number of attachments is not limited to 3, and may be less than 3 or may be 4 or more.

The reflecting members 1021 to 1023 has a size of, for example, about 5 cm×5 cm, and contains a material having high reflectance against infrared light. Surfaces of the reflecting members 1021 to 1023 may be covered with the material having high reflectance. Alternatively, a predetermined character or a specific pattern may be formed on the surfaces with the material having high reflectance and a material having low reflectance. Thus, each of the plural cows can be identified based on the reflecting members.

In FIG. 10, 10b shows a functional configuration of the determining data generating unit 1030 that generates determining data based on the photographed image of the cow 140 to which the reflecting members 1021 to 1023 are attached. The differences from the determining data generating unit 131 explained using FIG. 4 are that the determining data generating unit 1030 has a reflecting member detecting unit 1031, and that the function of the skeleton estimating unit 1032 is different from that of the skeleton estimating unit 403.

The reflecting member detecting unit 1031 detects the reflecting members 1021 to 1023 from the rectangular area extracted by the cattle region extracting unit 402 and specifies a head position, a neck position, and a buttock position of the cow 140. Any method of detecting the reflecting members 1021 to 1023 by the reflecting member detecting unit 1031 may be employed. For example, the reflecting members 1021 to 1023 may be detected based on a difference in a brightness value between the area of the reflecting members 1021 to 1023 and other areas. Alternatively, the rectangular area may be input into a trained image recognition model to detect the area of the reflecting members 1021 to 1023.

The skeleton estimating unit 1032 estimates a skeleton position (two-dimensional) of the cow 140 contained in the rectangular area extracted by the cattle region extracting unit 402. In estimating the skeleton position, the skeleton estimating unit 1032 refers to the head position, the neck position, and the buttock position specified by the reflecting member detecting unit 1031.

Thus, in the case of ruminants such as cattle, where a head and a buttock are difficult to distinguish and the skeleton position is liable to be misestimated, according to the skeleton estimating unit 1032, the estimation accuracy of the skeleton position can be improved.

Summary

As is clear from the above description, the action determining apparatus 130 according to the second embodiment has the following features, in addition to the first embodiment:

being equipped with a reflecting member detecting unit that detects an area of a reflecting member and specifies a head position, a neck position, and a buttock position of a cow, when a photographed image photographed in a state where the reflecting members are attached to the head, the neck and the buttock of the cow is acquired; and being equipped with a skeleton estimating unit that refers to the specified head position, the specified neck position, and the specified buttock position of the cow, when a skeleton position of the cow is estimated from the photographed image.

Thus, according to the second embodiment, the estimation accuracy of a skeleton position of a cow can be improved. As a result, according to the second embodiment, action determining of a ruminant can be accurately performed from a photographed image.

Third Embodiment

In the first embodiment described above, when the determining data are generated from the photographed image, the rectangular area containing the cow is directly extracted from the photographed image. On the other hand, in the third embodiment, a reflecting member, which is an example of an optical member, is attached to the cow in advance, and the rectangular area containing the cow is extracted in consideration of a position of the reflecting member detected from the photographed image. Thus, according to the third embodiment, the extraction accuracy of the rectangular area containing the cow can be improved. Hereafter, the third embodiment will be described with a focus on the differences from the first embodiment.

<Functional Configuration of Determining Data Generating Unit>

Figure 11:
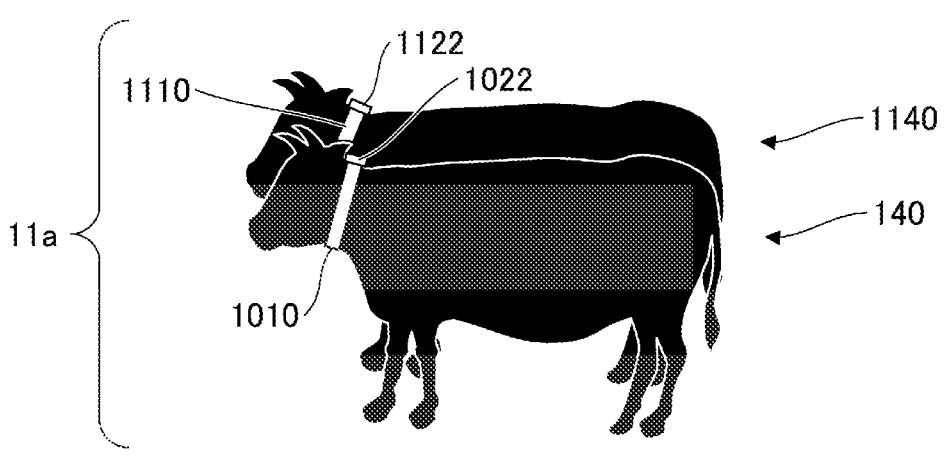
FIG. 11 is a second diagram showing another example of a functional configuration of the determining data generating unit.

First, a functional configuration of the determining data generating unit in the action determining apparatus according to the third embodiment will be described. FIG. 11 is a second diagram showing yet another example of the functional configuration of the determining data generating unit.

In FIG. 11, 11a shows a position of the reflecting members when the reflecting members are attached to cows 140 and 1140. Specifically, the example of 11a in FIG. 11 shows a state in which a reflecting member 1022 is attached to a neck of the cow 140 (an upper part of a neck attachment member 1010) and a reflecting member 1122 is attached to a neck of the cow 1140 (an upper part of a neck attachment member 1110). Since details of the reflecting member have already been described in the above second embodiment, a detailed description is omitted here.

In FIG. 11, 11b shows a functional configuration of the determining data generating unit 1130 that generates determining data based on the photographed images of the cows 140 and 1140 to which the reflecting members 1022 and 1122 are attached. The differences from the determining data generating unit 131 explained using FIG. 4 are that the determining data generating unit 1130 has a reflecting member detecting unit 1131, and that the function of the cattle region extracting unit 1132 is different from that of the cattle region extracting unit 402.

The reflecting member detecting unit 1131 detects reflecting members 1022 and 1122 from the photographed image acquired by the image acquiring unit 401, and specifies neck positions of the cows 140 and 1140.

The cattle region extracting unit 1132 extracts a rectangular area for the cows 140 and 1140 included in the photographed image. At this time, the cattle region extracting unit 1132 refers to the neck positions of the cows 140 and 1140 specified by the reflecting member detecting unit 1131, and extracts the rectangular area distinguishing between the cow 140 from the cow 1140.

Thus, the extraction accuracy of a rectangular area containing a cow can be improved even when a plurality of cows overlap in a photographed image.

Summary

As is clear from the above description, the action determining apparatus 130 according to the third embodiment has the following features, in addition to the first embodiment:

being equipped with a reflecting member detecting unit that detects an area of a reflecting member and specifies a position of a neck of a processing-target cow, when a photographed image photographed in a state where the reflecting member is attached to the neck of the cow is acquired; and being equipped with a cattle region extracting unit that refers to the specified position of the neck of the cow, when a rectangular area containing the cow is extracted from the photographed image.

Thus, according to the third embodiment, the extraction accuracy of a rectangular area containing a cow can be improved. As a result, according to the third embodiment, action determining of a ruminant can be accurately performed from a photographed image.

Fourth Embodiment

In the first embodiment described above, when the determining data are generated from the photographed image, the area around the mouth of the processing-target cow (cow 140) is cut. On the other hand, in the fourth embodiment, a reflecting member, which is an example of an optical member, is attached to a determining area useful for determining presence or absence of a ruminating action in the processing-target cow (cow 140), and an image of an area of the reflecting member detected from the photographed image is added to the determining data. Thus, according to the fourth embodiment, when the information indicating presence or absence of a ruminating action is inferred, the image of the area of the reflecting member can be taken into consideration in addition to the image of the area around the mouth. As a result, according to the fourth embodiment, it is possible to determine accurately presence or absence of a ruminating action of the processing-target cow from the photographed image. Hereafter, the fourth embodiment will be described with a focus on the differences from the first embodiment.

<Functional Configuration of the Determining Data Generating Unit>

Figure 12:
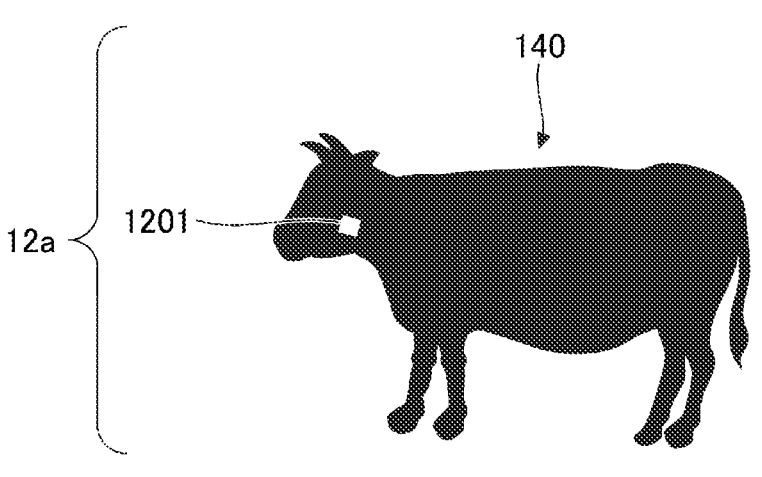
FIG. 12 is a third diagram showing another example of a functional configuration of the determining data generating unit.

First, a functional configuration of a determining data generating unit in the action determining apparatus according to the fourth embodiment will be described. FIG. 12 is a third diagram showing still another example of the functional configuration of the determining data generating unit.

In FIG. 12, 12a shows an attachment position of the reflecting member when the reflecting member is attached to the cow 140. Specifically, the Example of 12a in FIG. 12 shows a state in which the reflecting member 1201 is attached to a jaw of the cow 140. Since details of the reflecting member have already been described in the second embodiment, a detailed description is omitted here.

In FIG. 12, 12b shows the functional configuration of the determining data generating unit 1230 that generates determining data based on the photographed image of the cow 140 to which the reflecting member 1201 is attached. The difference from the determining data generating unit 131 described using FIG. 4 is that the determining data generating unit 1230 has a reflecting member detecting unit 1231 and a mouth periphery and reflecting member cutting unit 1232.

The reflecting member detecting unit 1231 detects the reflecting member 1201 from the photographed image acquired by the image acquiring unit 401. The reflecting member detecting unit 1231 notifies an area of the detected reflecting member 1201 to the mouth periphery and reflecting member cutting unit 1232.

The mouth periphery and reflecting member cutting unit 1232 outputs the area of the reflecting member 1201 and the area around the mouth of the processing-target cow (cow 140) notified by the reflecting member detecting unit 1231 as determining data.

Thus, when the training unit 133 performs training process on the determining model 602, the area of the reflecting member 1201 and the area around the mouth of the processing-target cow can be used as inputs. As a result, according to the generated trained model, it is possible to accurately determine presence or absence of a ruminating action of the processing-target cow from the photographed image.

Summary

As is clear from the above description, the action determining apparatus 130 according to the fourth embodiment has the following features, in addition to the above-described first embodiment:

being equipped with a reflecting member detecting unit that detects an area of a reflecting member, when a photographed image photographed in a state where the reflecting member is attached to a jaw of a processing-target cow is acquired; and being equipped with a mouth periphery and reflecting member cutting unit that outputs the area of the detected reflecting member and the area around the mouth of the processing-target cow as determining data.

Thus, according to the fourth embodiment, when the training unit performs training process on the determining model, the area of the reflecting member and the area around the mouth of the processing-target cow can be used as inputs. As a result, according to the fourth embodiment, the action determining of a ruminant can be accurately performed from a photographed image.

Other Embodiments

In the first embodiment described above, the determining data generating unit 131 estimates the two-dimensional skeleton position from the rectangular area containing the cow. However, the function possessed by the determining data generating unit 131 is not limited to this, and for example, the determining data generating unit 131 may have a function of estimating a three-dimensional skeleton position, or a function of estimating a three-dimensional shape of the cow, from the rectangular area containing the cow.

In this case, the mouth periphery cutting unit 405 may specify coordinates of the area around the mouth of the processing-target cow (cow 140) using the three-dimensional skeleton position of the processing-target cow (cow 140);

information on the three-dimensional shape of the processing-target cow (cow 140); and the like, in addition to the two-dimensional skeleton position of the processing-target cow (cow 140) and an area of the processing-target cow (cow 140).

When the three-dimensional skeleton position is estimated, instead of sequentially extracting rectangular areas each containing a cow and then estimating the skeleton positions, the skeleton positions may be estimated in parallel for all cows included in the photographed image without extracting rectangular areas containing cows.

In addition, in the above-described first embodiment, the case where information indicating presence or absence of a ruminating action was inferred by using the trained model was described. However, the method of inferring information indicating presence or absence of a ruminating action is not limited to this, and for example, information indicating presence or absence of a ruminating action may be inferred by calculating an autocorrelation coefficient for an area around the mouth at each time included in the determining data and using a value of the calculated autocorrelation coefficient.

In each of the above-described embodiments, the case where information indicating presence or absence of a ruminating action was inferred from the photographed image was described. However, an action of a ruminant inferred from the photographed image is not limited to a ruminating action, and may be other actions. In addition to presence or absence of a ruminating action, it may be determined, for example, whether the ruminant is in a ruminating action or a feeding action.

In each of the above-described embodiments, the case in which the determining model 602 was arranged and training process was applied to realize the function of inferring information indicating presence or absence of a ruminating action was described. However, the application target of training process is not limited to this. For example, a model may be arranged in each unit (the cattle region extracting unit 402, the skeleton estimating unit 403, the cattle region following unit 404) of the determining data generating unit 131, and training process may be applied to realize each function.

In each of the above-described embodiments, an area around the mouth is cut as a useful determining area for determining presence or absence of a ruminating action. However, other determining areas may be cut for performing action determining for actions other than the ruminating action. Moreover, the determining area to be cut when performing the action determining is not limited to a single kind of determining area, and a plurality of kinds of determining areas may be cut. It should be noted that actions other than the ruminating action include, for example, walking, resting, excreting and calving.

Alternatively, the action determining may be performed using information other than the cut determining area regardless of whether to determine presence or absence of a ruminating action or to perform action determining for the action other than the ruminating action. For example, information on the orientation and posture of the processing-target cow, determined based on the estimated skeleton position, may be used.

In each of the above-described embodiments, among the plurality of cows contained in the photographed image, the cow 140 was set to be a processing-target cow, but a cow other than the cow 140 may be set to be the processing-target cow, or the plurality of cows including the cow 140 may be set to be the processing-target cows and processed in parallel.

When the plurality of cows are set to be the processing-target cows, in the cattle region extracting unit 402 and the cattle region following unit 404, process, such as extracting rectangular area or following area, is performed simultaneously for a plurality of cows (in the present case, two cows) in each of the photographed images 310_1 to 3103, for example. That is, process such as extracting rectangular area or following area for the photographed image may be performed by a two-shot method or a one-shot method.

In each of the above-described embodiments, the case in which the ruminant is a cow was described. However, the ruminant is not limited to a cow, and the ruminant may be another livestock animal or the ruminant may be a ruminant other than a livestock animal.

In each of the above-described embodiments, the training unit 133 and the inferring unit 134 formed an integrated device. However, the training unit 133 and the inferring unit 134 may form separate devices.

In each of the above-described embodiments, it was not specifically mentioned whether the training process and the inferring process by the action determining apparatus 130 was realized by cloud computing or realized by edge computing. However, the training process and the inferring process by the action determining apparatus 130 may be realized by cloud computing or may be realized by edge computing.

In each of the above-described embodiments, it was explained that the processing-target cow when the determining data were generated in the training phase and the processing-target cow when the determining data were generated in the inferring phase were the same cow (cow 140). However, the processing-target cow when the determining data are generated in the training phase and the processing-target cow when the determining data are generated in the inferring phase may be different.

It should be noted that the present 110 invention is not limited to the configuration shown here, such as a combination of the configuration included in the above-described embodiments with other elements. In these respects, it is possible to change the embodiment in any way without departing from the spirit of the invention, and how to change can be appropriately determined in accordance with what the present invention is applied to.

DESCRIPTION OF SYMBOLS

100: Action determining system
110: Imaging apparatus
130: Action determining apparatus
131: Determining data generating unit
132: Action information acquiring unit
133: Training unit
134: Inferring unit
330: Training data
401: Image acquiring unit
402: Cattle region extracting unit
403: Skeleton estimating unit
404: Cattle region following unit
405: Mouth periphery cutting unit
602: Determining model
702: Trained model
1031: Reflecting member detecting unit
1032: Skeleton estimating unit
1131: Reflecting member detecting unit
1132: Cattle region extracting unit
1231: Reflecting member detecting unit
1232: Mouth periphery and reflecting member cutting unit

The invention claimed is:

1. An apparatus, comprising:

a processor; and a memory having instructions stored thereon that, when executed by the processor, cause the apparatus to:

estimate a skeleton position of a processing-target ruminant in each photographed image of a plurality of photographed images to generate a plurality of estimated skeleton positions, wherein the photographed images of the plurality of photographed images are photographed in a predetermined time range;

extract a region of the processing-target ruminant from each photographed image of the plurality of photographed images to generate a plurality of extracted regions;

cut a determining area from each photographed image of the plurality of photographed images to generate a plurality of determining areas for determining an action of the processing-target ruminant based on the plurality of estimated skeleton positions and the plurality of extracted regions; and determine the action of the processing-target ruminant based on the determining areas of the plurality of determining areas.

2. The apparatus as claimed in claim 1, wherein the apparatus is further caused to:

input the plurality of determining areas into a determining model, wherein the determining model is trained in a training phase associating the determining areas of the plurality of determining areas with the action of a ruminant.

3. The apparatus as claimed in claim 1, wherein the apparatus is further caused to:

determine whether a ruminating action of the processing-target ruminant is present or absent, or determine whether the processing-target ruminant is in the ruminating action or a feeding action.

4. The apparatus as claimed in claim 1, wherein the photographed images of the plurality of photographed images are photographed in a state in which an optical member is attached to at least a neck of the processing-target ruminant.

5. The apparatus as claimed in claim 4, wherein the apparatus estimates the skeleton positions of the plurality of skeleton positions based on a position of the optical member detected in each photographed image of the plurality of photographed images.

6. The apparatus as claimed in claim 4, wherein the apparatus extracts the the extracted regions of the plurality of extracted regions based on a position of the optical member detected in each photographed image of the plurality of photographed images.

7. The apparatus as claimed in claim 4, wherein the apparatus is further caused to determine the processing-target ruminant-based on a region of the optical member detected in the photographed images of the plurality of photographed images and the determining areas of the plurality of determining areas.

8. A method comprising:

estimating a skeleton position of a processing-target ruminant in each photographed image of a plurality of photographed images to generate a plurality of estimated skeleton positions, wherein the photographed images of the plurality of photographed images are photographed in a predetermined time range;

extracting a region of the processing-target ruminant from each photographed image of the plurality of photographed images to generate a plurality of extracted regions;

cutting a determining area from each photographed image of the plurality of photographed images to generate a plurality of determining areas for determining an action of the processing-target ruminant based on the plurality of estimated skeleton positions and the plurality of extracted regions; and determining the action of the processing-target ruminant based on the determining areas of the plurality of determining areas.

9. A non-transitory computer readable medium having instructions stored thereon that, when executed by a processor, cause an apparatus to:

estimate a skeleton position of a processing-target ruminant in each photographed image of a plurality of photographed images to generate a plurality of estimated skeleton positions, wherein the photographed images of the plurality of photographed images are photographed in a predetermined time range;

extract a region of the processing-target ruminant from each photographed image of the plurality of photographed images to generate a plurality of extracted regions;

cut a determining area from each photographed image of the plurality of photographed images to generate a plurality of determining areas for determining an action of the processing-target ruminant based on the plurality of estimated skeleton positions and the plurality of extracted regions; and determine the action of the processing-target ruminant based on the determining areas of the plurality of determining areas.

\* \* \* \* \*